W. H. WHITE.
DOUGH RAISER.
APPLICATION FILED MAY 23, 1910.

997,527.

Patented July 11, 1911.

Witnesses
E. B. Maurer
A. L. Phelps

Inventor
William H. White
By C. C. Shepherd
Attorney

UNITED STATES PATENT OFFICE.

WILLIAM H. WHITE, OF COLUMBUS, OHIO.

DOUGH-RAISER.

997,527.

Specification of Letters Patent. Patented July 11, 1911.

Application filed May 23, 1910. Serial No. 562,982.

*To all whom it may concern:*

Be it known that I, WILLIAM H. WHITE, a citizen of the United States, residing at Columbus, in the county of Franklin and State of Ohio, have invented certain new and useful Improvements in Dough-Raisers, of which the following is a specification.

My invention relates to dough raisers and the objects of my invention are to provide an improved oven-like structure adapted to receive and inclose bread dough or sponge and to subject the sponge to a uniform heat for the purpose of causing the sponge to rise prior to the baking thereof; to provide improved means for directing and distributing the heat from a lamp or other source of heat to the bread dough or sponge containing compartment and to produce other improvements the details of which will be more fully pointed out hereinafter. These objects I accomplish in the manner illustrated in the accompanying drawing, in which—

Figure 1:
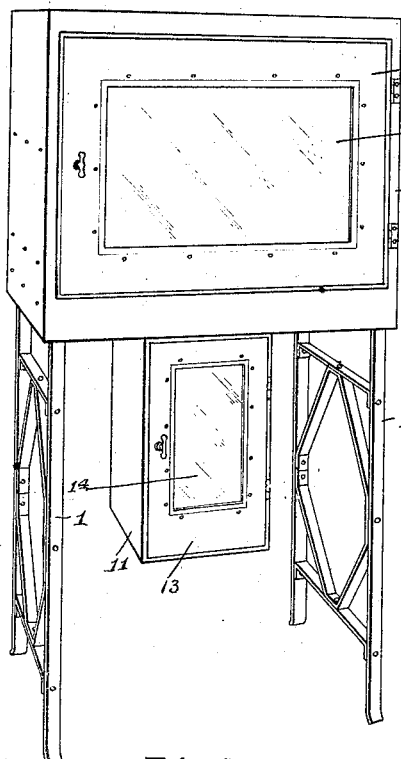
Figure 2:
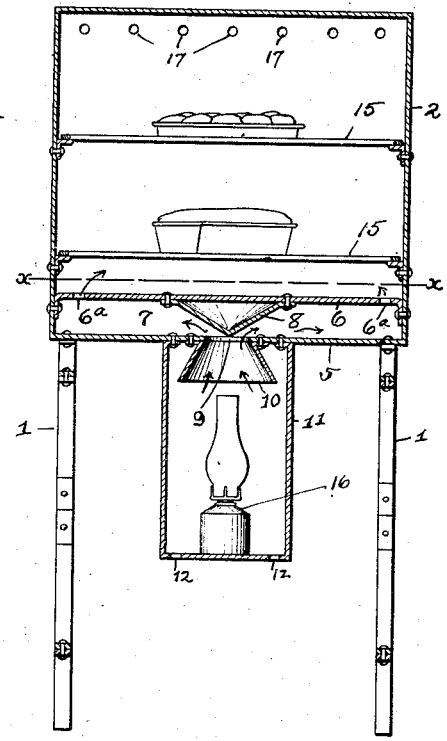
Figure 3:
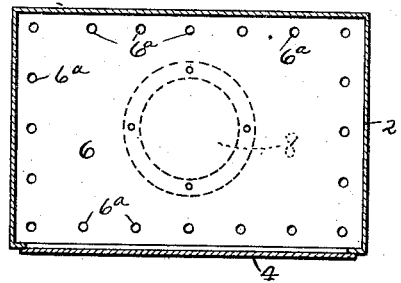

Figure 1 is a view in perspective of my improved bread raising device, Fig. 2 is a central vertical section thereof, and, Fig. 3 is a transverse section on line x—x of Fig. 2.

Similar numerals refer to similar parts throughout the several views.

In carrying out my invention I employ suitable supporting standards 1, upon which are mounted a box-like casing 2, the forward side of said casing being provided with a doorway of suitable size, which is adapted to be closed by a hinged door 3, the latter having a panel of glass or other transparent material as indicated at 4.

5 represents the horizontal bottom plate of the casing and at a suitable distance above this bottom plate, the casing is provided with a horizontal partition plate 6, which forms a comparatively shallow compartment 7 in the base of the casing body 2.

Depending from the underside of the central portion of the partition plate 6 is a conical deflector 8 which deflector is immediately above an opening 9 in the center of the bottom plate 5. From about this bottom plate 5 there projects downwardly a flaring open-mouthed hood or conductor 10, such conductor thus extending within the upper portion of a comparatively small box-like casing 11 which depends from the under-side of said bottom plate 5. This lower and smaller case 11 is provided in its lower portion with air inlet openings 12 and its otherwise open outer side is adapted to be closed by a suitable door 13, said door, as provided for the door 3 having a transparent panel 14. The partition plate 6 is provided preferably near its marginal portion with vertical openings 6ª and above the partition plate 6 at desired intervals, I provide within the casing 2, horizontal shelves 15 which shelves are designed to support the pans of bread dough or sponge which is to be raised.

Within the lower and smaller depending casing 11 is intended to be supported a lamp 16, or other suitable heat generating device. As will readily be understood, the heated air from the lamp is directed upward through the conductor 10 through the opening 9 and against the surface of the conical deflector 8, which tends to spread the heat in all directions from the center of the deflector, thus subjecting the partition plate 6 to a substantially uniform heat throughout its surface. From the compartment 7 the heated air may pass upward through the openings 6ª into the body of the casing 2, the air within the casing thus being subjected to the heat which passes through said openings and that which is radiated by the bottom plate 6. I preferably provide the upper portion of the casing 2 with a plurality of comparatively small outlet openings 17 to insure the proper outlet of the heated air and the production of the proper draft through the casing.

As is well known, it has been customary in raising dough preparatory to baking the same in an oven, to place the pan containing the sponge adjacent to a stove or other heating appliance in order that the sponge may be subjected to a comparatively mild heat, and as is well known, this process of raising the sponge, is not wholly successful owing to the failure to subject the entire mass of sponge to a steady and uniform heat of the desired temperature. By employing the device which I have herein described, it will readily be understood that these difficulties will be overcome and that the heating lamp or other device 6 may be so regulated as to insure the maintenance of uniform heat within the casing 2 and the proper raising of the sponge contained therein.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

What I claim, is—

In a dough raiser, the combination with a supporting frame, a casing mounted on said frame and provided with a shelf, a horizontally disposed perforated partition within the casing below the shelf, a conical deflector depending from the central portion of said horizontal partition, a smaller casing depending from the bottom of the upper casing and at a point approximately directly beneath the conical deflector, and a flaring conductor arranged beneath the conical deflector and depending from an opening in said upper casing bottom, said conductor having its smaller end adjacent to the conical deflector and its widened or flared end extending into the smaller casing, and a heat generating device in the lower casing.

In testimony whereof I affix my signature in presence of two witnesses.

WILLIAM H. WHITE.

Witnesses:
C. C. SHEPHERD,
JOHN H. EAGLESON.